United States Patent [19]
Ogle et al.

[11] Patent Number: 5,322,578
[45] Date of Patent: Jun. 21, 1994

[54] PROCESS FOR MANUFACTURING A PROTECTIVE SKIN FOR RESURFACING REUSABLE BEVERAGE CONTAINERS

[75] Inventors: Edwin Ogle; Donald G. O'Gara, both of Tacoma, Wash.

[73] Assignee: Cole Screen Print, Inc., Tacoma, Wash.

[21] Appl. No.: 959,038

[22] Filed: Oct. 8, 1992

[51] Int. Cl.⁵ ............................................. B32B 31/00
[52] U.S. Cl. ........................................ 156/64; 156/86; 428/542.6
[58] Field of Search ............... 156/64, 86, 94, 99, 156/100; 428/34.7, 34.9, 35.1, 35.2, 35.5, 35.7, 36.92, 68, 36.9, 542.6, 542.8, 542.2

[56] References Cited
U.S. PATENT DOCUMENTS

| | | | |
|---|---|---|---|
| 3,760,968 | 9/1973 | Amberg et al. | 156/86 |
| 3,829,348 | 8/1974 | Spiegel et al. | 156/86 |
| 3,967,993 | 7/1976 | Isomi | 156/86 |
| 3,967,995 | 7/1976 | Fabianic | 156/86 |
| 4,190,168 | 2/1980 | Jacques | 156/86 |
| 4,491,494 | 1/1985 | Davis, Jr. et al. | 156/86 |
| 4,778,545 | 10/1988 | Von Derau et al. | 156/64 |
| 4,923,557 | 5/1990 | Dickey | 156/86 |
| 5,078,817 | 1/1992 | Takagaki | 156/86 |

*Primary Examiner*—David A. Simmons
*Assistant Examiner*—William J. Matney, Jr.
*Attorney, Agent, or Firm*—Stephen M. Evans; David L. Garrison

[57] ABSTRACT

A process is disclosed for manufacturing a protective skin for resurfacing reusable beverage containers. First, the peripheral surface of a cylindrical beverage container is measured and recorded, the measurements being used as a template for forming the skin from the substrate. Second, a suitable thermoplastic substrate is chosen such as scratch resistant vinyl or LEXAN®. Third, a graphic image or product name can be back printed on the substrate. Fourth, an adhesive backing is applied to the printed side of the substrate. And fifth, the substrate is formed into the desired shape by an apparatus using the recorded measurements of the beverage container. The resulting chemical and abrasion resistant protective skin may then easily be applied by any consumer wishing to cover the peripheral surface of a reusable beverage container that may have become damaged through use or misuse or to apply custom graphics and/or a logo thereto.

8 Claims, 2 Drawing Sheets

PROCESS FOR MANUFACTURING A PROTECTIVE SKIN FOR RESURFACING REUSABLE BEVERAGE CONTAINERS

FIELD OF THE INVENTION

The present invention relates to a process for manufacturing a protective skin for restoring or resurfacing beverage containers or servers. More particularly, the invention discloses methods for manufacturing an inert skin formed so as to cover the peripheral surface of a reusable beverage container or server. The skin is a durable protective outer covering that can be easily applied to a multitude of reusable beverage containers to prevent damage to and premature wearing of the original surface and to provide a means for applying custom graphics and illustrations thereon.

BACKGROUND OF THE INVENTION

Conventional reusable beverage containers or servers generally comprise a cylindrical type vessel that may or may not have graphic images on their exterior surface or shell. Large beverage containers especially commercial hot beverage servers generally have a stainless steel protective outer shell. The shell has a dual function: to provide a protective covering for the internal components of the container (or the shell may also contain the liquid) and to provide a surface that is visually pleasing.

Application of this shell usually occurs during the manufacturing process. Once applied, it cannot easily be replaced if damaged, nor has it been commercially feasible to reprint any graphic images on the surface of the shell if they have become faded or altered through use. In both of these situations, the functionality of the shell to shield the inner components (or to contain a liquid) is usually not compromised. Instead, it is the visual appearance of the shell that has become undesirable.

Metal shells are the traditional materials of choice. Metal shells are easily manufactured and integrated into the great variety of beverage containers and especially hot beverage servers. These shells provide adequate impact resistance, but when the metal deforms, it does not return to its original shape. Consequently, the aesthetic value of the shell, and hence the container, diminishes.

While the appearance of personal beverage containers is generally not an important factor in their usability, commercial settings create a need for visually appealing accessories. In commercial settings, the image and the ability of that image to convey a message are often just as important as the ability of the item to function properly. Consequently, when the visual image of a commercial container or server no longer conveys the intended message nor provides the intended function, the container is often cannibalized or a replacement container is obtained. While accomplishing the goals of the business, such a practice can be expensive and time consuming.

Therefore, a need exists to have a method for restoring the exterior surface or shell of a reusable beverage container or server whereby a new protective skin will enhance the container's ability to withstand everyday use without losing its aesthetic qualities. The need also exists to refurbish the exterior surface or shell such a container so that desirable graphic images or patterns can permanently be displayed without fear of degradation. Similarly, a need also exists to provide a method for permanently applying customizable graphic images to the exterior surface or shell of commercially produced, reusable beverage containers. In addition, a process and product meeting these needs must be inexpensive and easy to carry out—the application of the product preferably performed by the possessor of the container.

SUMMARY OF THE INVENTION

The present invention comprises a product and process for manufacturing a flexible and durable protective outer skin for resurfacing reusable beverage containers and servers comprising the following steps: In a first step, the peripheral surface of the container to be wrapped is mapped and stored as data. This data is translated into a two dimensional representation of the three dimensional shape of the peripheral surface of the container and will serve as a template for forming the protective skins. In a second step, a suitable protective substrate is chosen for manufacture into a skin. The choice of substrate is dependent upon the anticipated environments the container will be subject to. In a third step, a durable and permanent adhesive is applied to the substrate. And in a fourth step, the aforementioned data is used to construct a mechanical cutter or direct the actions of a linear cutter to form the desired shape of the skin.

In the preferred embodiment, the container is a pump type, thermal beverage server. The peripheral surface of the server is mapped and stored as a two dimensional object from which a steel rule die is constructed. A suitable substrate, preferably having a textured outer surface, is chosen and cut into segments to facilitate the manufacturing process. These segments of substrate then may be imprinted with a pattern or logo after which a laminating type adhesive is applied thereto. The sheets of substrate then pass through a cutting apparatus that utilizes the steel rule die (a clam shell press). The resulting skins may then be applied to the specific beverage server. Once applied, the skin uniformly covers most surface defects and blemishes of the server, and creates a durable and customized, scratch and abrasion resistant cover.

A feature of the invention is to provide a skin that decreases any actual or perceived surface damage to the container's shell by utilizing a random patterned image. In the preferred embodiment, back printing of a transparent substrate is used. By utilizing a back printing method, any image or custom pattern created on the substrate will be intermediate the container shell and the outer surface of the protective skin. Thus, the printed graphics are shielded from the external environment by the protective skin. This feature of the invention also permits the imprinting of customized graphics or logos that will not fade, scratch, or otherwise significantly be affected over time.

Another feature of the invention provides for the application of a decal application fluid to the container or the adhesive prior to applying the skin, thereby permitting minor adjustments to be made to the alignment of the skin on the container. This feature beneficially permits precise location of the skin on the container without sacrificing the integrity of the container-skin bond.

DETAILED DESCRIPTION OF THE INVENTION

Figure 1:
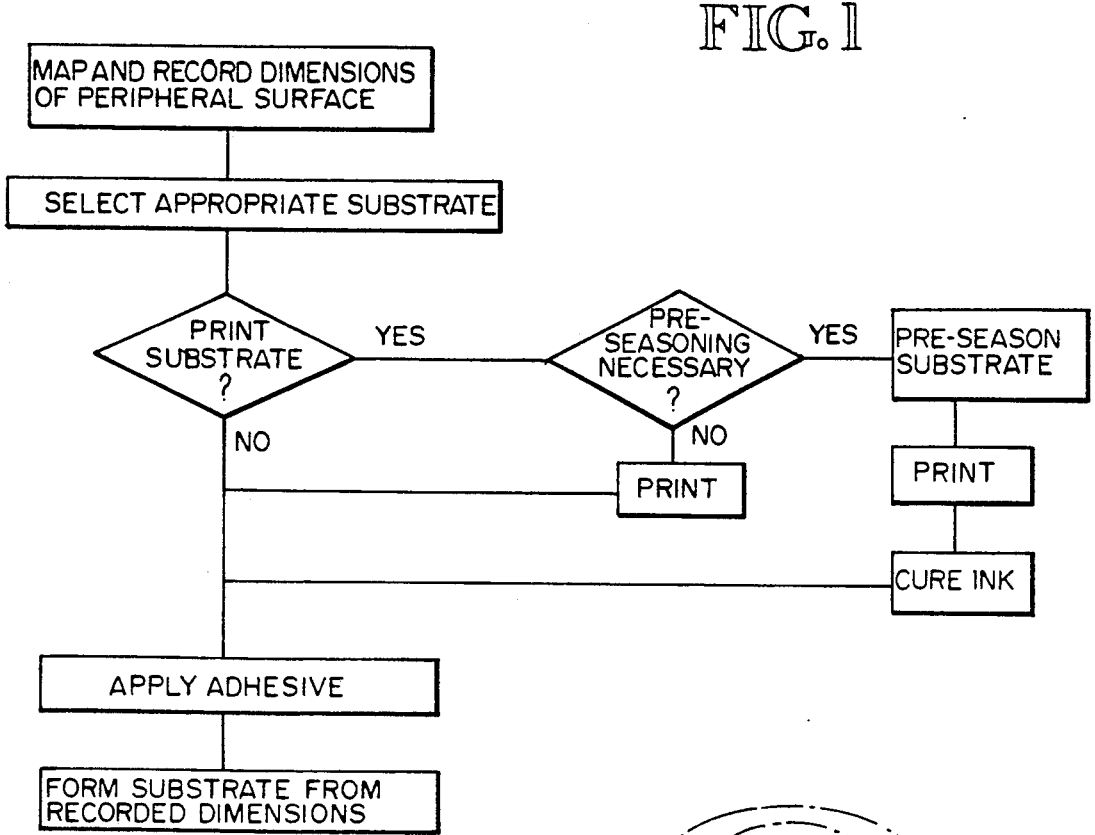
FIG. 1 is a flowchart illustrating a process for manufacturing the present invention.
Figure 2:
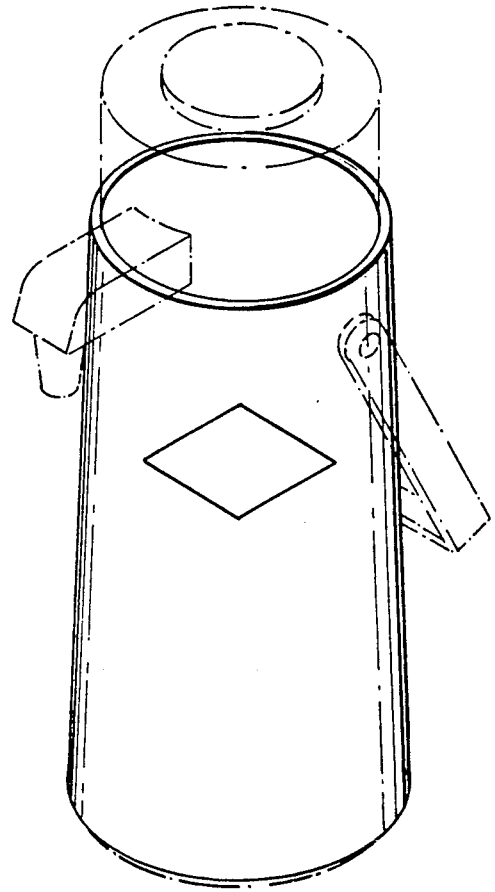
FIG. 2 shows a perspective view of a preferred embodiment of the invention with a thermally insulated, pump operated beverage server shown in phantom.
Figure 3:
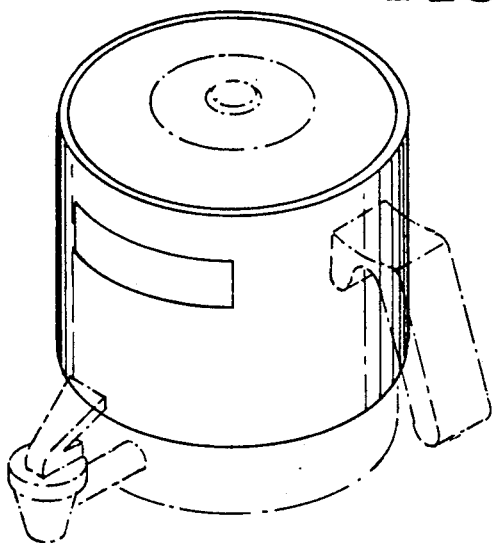
FIG. 3 shows a perspective view of an alternative embodiment of the invention with a coffee percolator shown in phantom.

The following description is shown in abbreviated form in FIG. 1 wherein the process relating the present invention begins with the mapping of the peripheral surface or shell of the beverage server to a plane surface. In essence, the peripheral surface is measured in a cylindrical coordinate system (a type of curvilinear coordinate system) and is translated into an X-Y cartesian coordinate system. The translated values may then be stored electronically or graphically.

Figure 4:
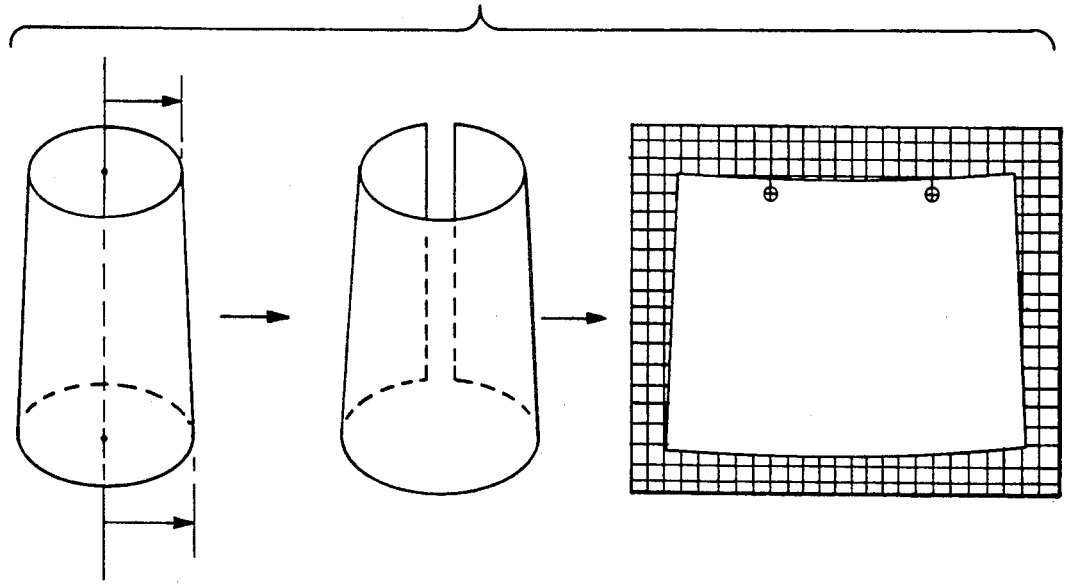
FIG. 4 shows the transfer of physical dimensions of the object in FIG. 2 to a plane surface.

As shown in FIG. 4, detailed measurements of the shell of the pump type beverage server are made and are transferred to an acetate sheet. The resulting line drawing of the peripheral surface is then used to create a die which will be used later in the manufacturing process. If a linear cutting device is used, e.g. a laser cutter or waterjet, the measurements can be electronically stored and utilized by the cutting apparatus.

From the dimensions of the server's shell as embodied on the acetate sheet, a workable production sheet size for the substrate can be calculated. The substrate must be able to withstand common detergents and abrasives, elevated temperatures, and repeated exposure to water. In addition, it must be impact resistant, scratch resistant, accept inks well, and be workable.

The next step consists of choosing an appropriate protective substrate that will become the new outer skin. If back printed graphic images are desired, the substrate must also be transparent. The inventors have found that scratch resistant vinyl (SRV) or LEXAN ® substrates having a textured outer surface are suitable for most applications. For either of these materials, a thickness of 0.010" (0.25 mm) is preferred. SRV, a relatively low cost material, is chosen for applications where high washing temperatures are not likely to be encountered. This material is readily available and durable. If a superior outer skin is desired, then LEXAN ® should be used, especially in environments subject to high washing temperatures. The textured surface beneficially provides a non-glare surface that further reduces the effect of shell damage and contamination of the substrate (e.g. finger prints).

It is well known that certain thermoplastics are more thermally stable than others. As briefly described above, LEXAN ® is more thermally stable than SRV. Because certain printing processes utilize ink drying equipment (hot air blowers), it may be necessary to "pre-season" a non-thermally stable substrate-that is to cause the substrate to preshrink prior to the application of graphic images. Pre-seasoning includes subjecting the substrate to conditions similar to those encountered during the ink drying process, e.g. hot, forced air, so that shrinkage of the substrate will occur prior to printing and cutting. As a result, pre-seasoning makes the substrate stable for the remaining steps of the manufacturing process. This thermal stability ensures that the final product has good die to graphic image match and that subsequent exposure to anticipated heat sources will not cause undesired shrinkage.

After pre-seasoning, if necessary, the substrate passes through a screen printing apparatus which imprints a reverse image (back printing) on the smooth side of the substrate. While screen printing is preferred, any printing process is acceptable. The inventors have found that ink produced by NAZ-DAR under the trade name of Plastics Plus Gloss Vinyl Screen Ink works equally well with the SRV and LEXAN ® substrates. If such inks are used, then the printed substrate should be processed through an ink dryer to speed the curing of the ink and hence, the manufacturing process. Should for any reason it be undesirable to use evaporative curing inks, ultra violet light curing inks may be substituted.

After the curing process has been accomplished, a laminating adhesive is then applied. Because the protective skin must be durable yet as thin as possible, the preferred embodiment utilizes a two mil (0.051 mm) industrial adhesive such as STAMARK TM 9502 Roll Laminating Adhesive or MP 467, both of which are manufactured by 3M. These adhesives are chosen for their durability and resistance to chemicals, heat, and water. The adhesives work equally well with SRV or LEXAN ® substrates.

The adhesive is applied to the back of the substrate by means of roll laminating. The resulting product is then run through a calendaring press or laminating press to fully bond the adhesive to the ink impregnated substrate which at this point is properly called the protective container skin.

Depending upon the application and design considerations, the sheets of skin are run through a die constructed to form a skin according to the dimensions obtained earlier. The die then cuts the skins to the aforementioned specific pattern. The waste product is removed and the resulting printed and adhesive backed protective skin is ready for application to the beverage server.

Because of the high bonding strength of the adhesive, removal of the skin is exceedingly difficult once it has been applied to the beverage server. While this aspect of the invention is desirable as to the longevity of the applied skin, it is undesirable should the skin be incorrectly aligned on the server. It has been found through experimentation that use of a decal application fluid on the peripheral surface of any container or on the exposed adhesive simplifies the application process by permitting minor alignment changes of the skin once applied. Such a solution, when applied to a beverage container or adhesive, prevents the adhesive from immediately bonding on contact. Instead, the decal application fluid permits alignment of the skin on the container for approximately 30 to 60 seconds, after which time, a solid and durable final bond between the wrap and the container occurs.

INDUSTRIAL APPLICABILITY

The present invention finds use predominantly in the reusable beverage container industry, as well as general use in any industry that requires retrofitting of cylindrical containers with a new exterior skin. The product and process of the invention provide an inexpensive means for resurfacing containers that have become damaged through use and to mitigate the aesthetically unattractive aspects thereof. In addition, the product and process provide a durable skin that resists damage occurring from normal use and permits custom graphic images to be permanently applied to the container.

What is claimed:

1. A method of manufacturing a protective skin for use in resurfacing reusable beverage containers comprising the steps of:
   a) measuring the dimensions of the peripheral surface of said container and recording said dimensions;
   b) choosing an appropriate thermally stable material to act as a substrate;
   c) applying a permanent adhesive to said substrate; and
   d) forming said substrate to cover the peripheral surface of the beverage container based on said dimensions.

2. The method of claim 1 further comprising transferring an image to said material prior to applying said adhesive.

3. The method of claim 2 wherein said image is back-printed on said substrate, said substrate being transparent.

4. The method of claim 3 wherein said adhesive is applied over said image.

5. The method of claim 1 wherein said peripheral surface is measured and recorded so as to facilitate the construction of a cutting die to form said substrate.

6. Method of claim 1 wherein the dimensions of the peripheral surface of said container are converted into electronic data that is utilized by a linear cutting apparatus.

7. Method of claim 1 wherein said adhesive is a roll laminate adhesive.

8. A method of manufacturing a protective skin for use in resurfacing reusable beverage containers comprising the steps of:
   a) measuring the dimensions of a peripheral surface of said container and translating said dimensions into a cartesian coordinate system;
   b) recording said translated dimensions;
   c) choosing an appropriate thermally stable material to act as a transparent substrate;
   d) back-printing said substrate to form an image thereon;
   e) applying an adhesive over said image; and
   f) forming said substrate into a skin to fit said peripheral surface by using said translated dimensions.

* * * * *